Patented Jan. 13, 1925.

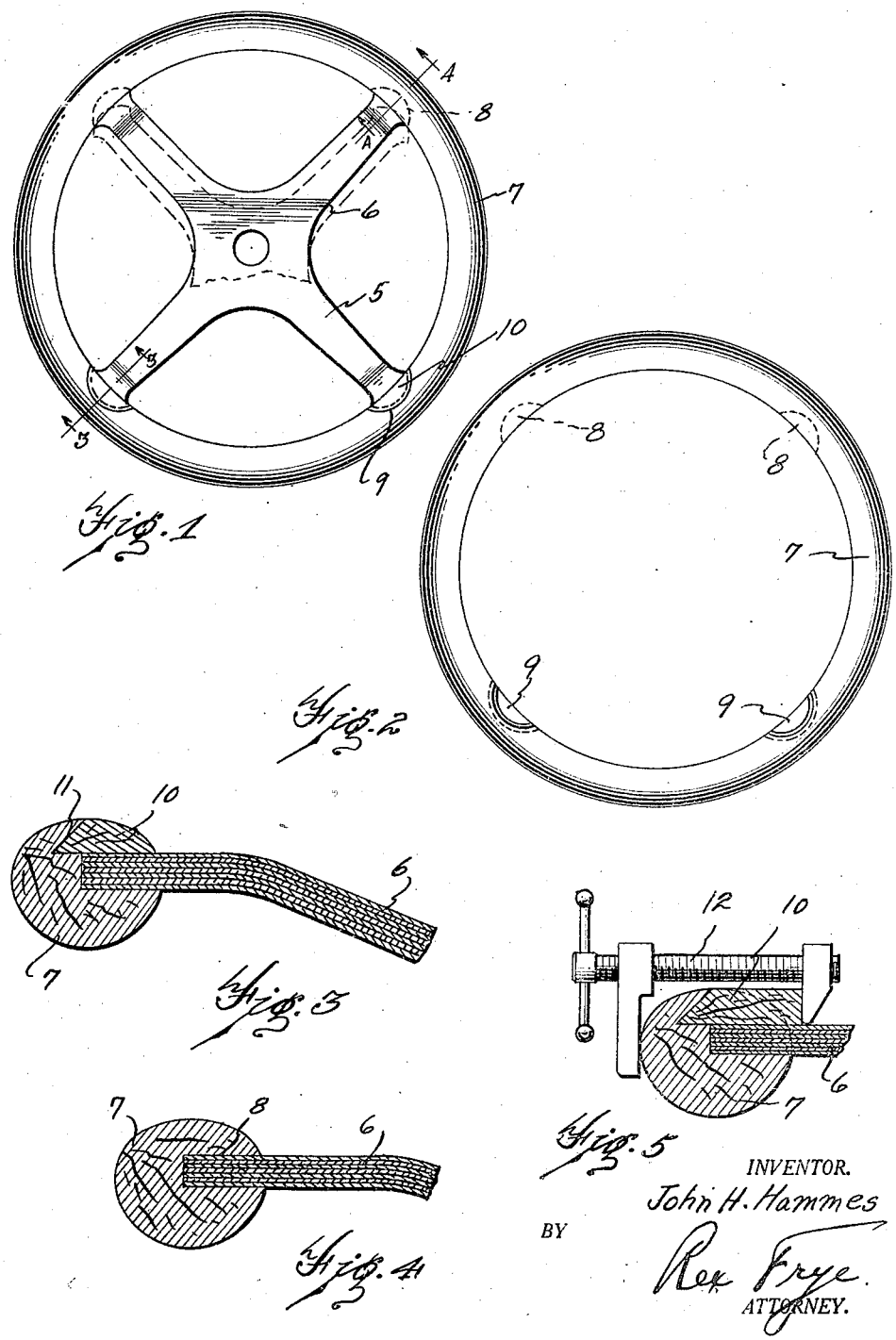

1,523,120

UNITED STATES PATENT OFFICE.

JOHN H. HAMMES, OF DETROIT, MICHIGAN, ASSIGNOR TO SEWELL CUSHION WHEEL COMPANY, OF DETROIT, MICHIGAN.

METHOD OF ASSEMBLING STEERING WHEELS.

Application filed February 25, 1924. Serial No. 694,828.

*To all whom it may concern:*

Be it known that I, JOHN H. HAMMES, a citizen of the United States, and resident of Detroit, in the county of Wayne and State of Michigan, have invented new and useful Improvements in Methods of Assembling Steering Wheels, of which the following is a specification.

This invention relates to steering wheels for automobiles, aeroplanes, boats and the like, and has for its primary object the provision of a simple, economical and practical method for securing the spider portions of the wheels to the rim portions without the use of screws, dowel pins, or other securing elements adapted to pierce the spokes or rim.

Another object of the invention is the arrangement of a unitary spider portion of a wheel with the ends of its spokes embedded in the unitary rim portion and secured therein by means invisible from the top and sides of the wheel.

A further object of the invention is the formation of an all-wood steering wheel with its periphery and upper face free from the unsightly joints usually incident to the securing of the spider spokes within the circular rim portion.

Other objects and advantages will be apparent from the following description, wherein reference is made to the accompanying drawings illustrating a preferred embodiment of my invention and wherein similar reference numerals designate similar parts throughout the several views.

In the drawings:

Fig. 1 is a bottom plan view of a steering wheel constructed in accordance with my invention.

Fig. 2 is a similar view of the rim portion before the spider and securing wedges are secured therein.

Figs. 3 and 4 are detail sectional views taken substantially on the lines 3—3 and 4—4 of Fig. 1 respectively, and Fig. 5 is a detail sectional view showing one method of clamping the securing wedge while the glue sets.

Referring now to the drawings, the numeral 5 designates the spider portion of a steering wheel, and as best shown in Figs. 3 and 4 is preferably formed of a plurality of superimposed layers 6 of non-metallic material, such as wood veneer, fibre, compressed paper, and the like. The layers 6 may be arranged in any desired form and shaped to any desired configuration before they are inserted within the rim 7 of the wheel. In my co-pending applications, Serial No. 590,780, filed September 27, 1922, and Serial No. 633,570, filed April 21, 1923, I have shown two forms of wood spiders that are particularly adapted for use with the herein disclosed method of assembling steering wheels.

It will be understood that the layer formation of the spider 5 is not essential to the use of my improved method and is shown herein merely for purposes of exemplification, and that metallic or other spider constructions can also be utilized to advantage with my improved method.

The rim portion 7 of my wheel is best illustrated in Fig. 2, and comprises a circular portion constructed of sections assembled in any desired manner into a unitary structure prior to the mounting of the spider portion in the rim. Substantially centrally of its depth, the rim 7 is formed with a plurality of recesses for the reception of the spoke ends of the spokes of the spider portion 5. As herein shown, a pair of adjacent recesses 8 are formed substantially as shown in Figs. 2 and 4, with their outer extremity curved to conform with the curvature of the spoke ends, and with their inner ends opening through the inner periphery of the rim. The remaining pair of recesses 9 are similarly shaped in their rear wall and also open at their inner extremities through the inner periphery of the rim, but their lower wall is removed to permit the introduction of the spoke ends to be housed in these recesses 9 from outside the lower portion of the rim.

By virtue of this construction, I am enabled to first insert a pair of spoke ends of the spider 5 into the covered recesses 8 by a direct thrust movement from the center of the wheel and then swing the remaining spoke ends into the uncovered recesses 9 by a movement from outside the lower surface of the rim. This permits of rapid assembly of the spider portions 5 into the rim portions 7, and the result is that we are enabled to insert the spider portions without distortion and without the necessity of piercing the spider spokes.

In order to properly maintain the spider portion within the uncovered recesses 9, I preferably provide a pair of plugs 10 adapted to cover the spoke ends and completely fill the portion of the rim recess not filled by the spoke ends. As herein shown an undercut or rabbeted groove 11 is formed in the lower portion of the rim with the upper wall thereof in alignment with the lower extremity of the spoke and slanting downwardly and inwardly from this lower wall so as to give a maximum surface for gluing the plug 10 within the rim and also bringing the exposed joint between the plug 10 and the under surface of the rim as far as expedient from the outer periphery of the rim. The rabbeted groove 11 is curved concentrically with the outer wall of the recesses 9, but is spaced outwardly beyond such outer wall to enable the use of a plug that will completely cover the spoke ends and also engage a comparatively large area of the rim itself.

In practice, after the spoke ends have been introduced into the recesses 9 from below the wheel, the plugs 10 are coated with glue and inserted into the rabbeted grooves 11 by an outward radial movement, and are then securely clamped in such position, as by the clamp 12 (see Fig. 5) during the time needed for the glue to set. Preferably the inner wall of the plug 10 is made with a shape lending itself to engagement by one jaw of the clamp 12. After the glue has set the projecting edges of the plug 10 are cut down, whereby the plug 10 assumes a shape substantially like that shown in Fig. 3, with the lower wall of the plug conforming to the curvature of the rim 7.

Preferably the spoke ends are coated with glue before they are applied to the recesses 8 and 9, and then after the plugs 10 have been similarly coated with glue and applied to the rabbeted grooves the clamp 12 will serve to hold both plugs and spider while the glue sets.

It will be noted that my recess for the plug 10 does not extend outwardly to the outer periphery of the rim, and so that the outer periphery as well as the upper surface of the rim is in no way defaced by the joint between the rim and plug. Furthermore, the extended surface for gluing and the ease of maintaining the plug in the desired position while the glue is being set renders my improved method one that is simple and time-saving in operation.

While I have described the opening for the introduction of the spoke ends into the recesses 9 as through the lower surface of the rim, it will be understood that this refers to the position assumed by the wheel when in use for driving an automobile or the like. In assembling, it is usual for the rim to be reversed to bring the normal lower surface thereof to the top whereby the workman is able to insert the spoke ends into the recesses 9 by lowering this portion of the spider 5 into these recesses.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim—

1. The method of assembling a steering wheel consisting of providing a solid rim portion with a pair of spoke-receiving recesses opening through the inner periphery of the rim and a pair of spoke-receiving recesses opening through one face of the rim, then inserting the ends of a pair of spider spokes into the first-mentioned recesses by a radial thrust movement, then inserting the ends of the other spider spokes into the last-mentioned recesses by movement from beyond the recessed face of the rim, and then filling the portions of the last-mentioned recesses not occupied by the spoke ends by plugs adapted to be secured to the rim.

2. The method of assembling a steering wheel consisting of providing a solid rim portion with a pair of spoke-receiving recesses opening through the inner periphery of the rim and a pair of spoke-receiving recesses opening through one face of the rim, the rim having a rabbeted groove adjacent the last-mentioned recesses, then inserting the ends of a pair of spider spokes into the first-mentioned recesses by a radial thrust movement, then inserting the ends of the other spider spokes into the last-mentioned recesses by movement from beyond the recessed face of the rim, and then filling the portions of the last mentioned recesses not occupied by the spoke ends by plugs adapted to fit into said rabbeted grooves and be secured to the rim.

3. The method of assembling a steering wheel consisting of providing a solid rim portion with a pair of spoke-receiving recesses opening only through the inner periphery of the rim and a pair of spoke-receiving-recesses opening through both the inner periphery and lower face of the rim, the rim having rabbeted grooves adjacent the last-mentioned recesses, then applying glue to the ends of a pair of spider spokes and inserting them into the first-mentioned recesses by a thrust movement, then applying glue to the ends of the remaining spider spokes and inserting them into the last-mentioned recesses by movement from below the rim, then applying glue to a pair of plugs shaped to fit said rabbeted grooves and inserting them into the rabbeted grooves, and then holding said plugs in position until the glue has set.

In witness whereof I hereunto set my hand.

JOHN H. HAMMES.

Witnesses:
 Rex Frye,
 Ethel Jedlisk.